(12) United States Patent
Toyora (10) Patent No.: US 12,296,708 B2
(45) Date of Patent: May 13, 2025

(54) COMMUNICATION FAILURE HANDLING DEVICE AND METHOD IN VPP

(71) Applicant: TOYOTA JIDOSHA KABUSHIKI KAISHA, Toyota (JP)

(72) Inventor: Sachio Toyora, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 611 days.

(21) Appl. No.: 17/694,110

(22) Filed: Mar. 14, 2022

(65) Prior Publication Data

US 2022/0297566 A1  Sep. 22, 2022

(30) Foreign Application Priority Data

Mar. 22, 2021 (JP) ................................. 2021-047722

(51) Int. Cl.
 *B60L 53/68* (2019.01)
 *B60L 3/12* (2006.01)
 *H04L 41/0654* (2022.01)

(52) U.S. Cl.
 CPC ............. *B60L 53/68* (2019.02); *B60L 3/12* (2013.01); *H04L 41/0654* (2013.01)

(58) Field of Classification Search
 CPC ......... B60L 53/68; B60L 3/12; H04L 41/0654
 USPC .................................................... 320/109
 See application file for complete search history.

(56) References Cited

U.S. PATENT DOCUMENTS

| | | | |
|---|---|---|---|
| 2012/0330494 A1* | 12/2012 | Hendrix | B60L 53/66 701/29.3 |
| 2017/0005515 A1* | 1/2017 | Sanders | H02J 3/388 |
| 2018/0218459 A1 | 8/2018 | Yokoyama et al. | |
| 2020/0023747 A1* | 1/2020 | Logvinov | B60L 55/00 |
| 2021/0036522 A1* | 2/2021 | Solomon | G06F 21/31 |
| 2021/0107373 A1* | 4/2021 | Nakamura | B60L 53/14 |
| 2021/0170901 A1* | 6/2021 | Brombach | B60L 53/63 |
| 2021/0221247 A1* | 7/2021 | Daniel | G06N 3/0464 |
| 2021/0252993 A1* | 8/2021 | Kinomura | G06Q 20/202 |
| 2021/0268924 A1* | 9/2021 | Darade | B60L 53/66 |

(Continued)

FOREIGN PATENT DOCUMENTS

| | | |
|---|---|---|
| EP | 3 334 007 A1 | 6/2018 |
| JP | 2014-054003 A | 3/2014 |

(Continued)

*Primary Examiner* — Jack Chiang
*Assistant Examiner* — Suchin Parihar
(74) *Attorney, Agent, or Firm* — Finnegan, Henderson, Farabow, Garrett, and Dunner, LLP (57) ABSTRACT

Information on a charging/discharging operation in a second period which is longer than a first period is transmitted as a control instruction from a control server. A communication failure handling device stores the control instruction transmitted in a cycle of the first period from the control server in a memory that is able to be accessed by an electric-vehicle power station regardless of a communication state between the control server and the electric-vehicle power station. When a communication failure has occurred between the control server and the electric-vehicle power station, the communication failure handling device causes the electric-vehicle power station to perform a charging/discharging operation based on the control instruction stored in the memory.

11 Claims, 6 Drawing Sheets

(56) References Cited

U.S. PATENT DOCUMENTS

2024/0202825 A1* 6/2024 Ko .......................... G06Q 50/06
2024/0262235 A1* 8/2024 Fukuoka ................. B60L 53/63

FOREIGN PATENT DOCUMENTS

| JP | 2017-038467 A | 2/2017 |
| JP | 2018-124674 A | 8/2018 |

* cited by examiner

FLOW OF NORMAL CONTROL INSTRUCTION

FIG. 3

FLOW OF CONTROL INSTRUCTION WHEN COMMUNICATION FAILURE HAS OCCURRED

COMMUNICATION FAILURE HANDLING DEVICE AND METHOD IN VPP

CROSS-REFERENCE TO RELATED APPLICATION

This application claims priority to Japanese Patent Application No. 2021-047722 filed on Mar. 22, 2021, incorporated herein by reference in its entirety.

BACKGROUND

1. Technical Field

The present disclosure relates to a communication failure handling device and method in a VPP.

2. Description of Related Art

Recently, a virtual power plant (VPP) using a motor-driven vehicle as an energy resource has been studied. An example thereof is disclosed in Japanese Unexamined Patent Application Publication No. 2018-124674 (JP 2018-124674 A). The technique disclosed in JP 2018-124674 A relates to a technique associated with a V2G system in which a power system and storage batteries mounted in a plurality of motor-driven vehicles transmit and receive electric power to and from each other. In this technique, information on charging and discharging is transmitted from a child aggregator to electric vehicle service equipment (EVSE). The child aggregator is a control server that manages charging and discharging, and the EVSE is an electric-vehicle power station that performs charging and discharging of a motor-driven vehicle.

SUMMARY

The control server and the electric-vehicle power station are connected to each other via a wired or wireless communication network. Accordingly, there is a likelihood that a communication failure will occur between the control server and the electric-vehicle power station while the VPP is operating. When communication has been cut off, the electric-vehicle power station cannot receive a control instruction for charging and discharging from the control server and cannot continue to perform a charging/discharging operation on a motor-driven vehicle. As a result, charging/discharging performance of the VPP decreases.

The present disclosure provides a technique capable of curbing a decrease in charging/discharging performance when a communication failure occurs between a control server and an electric-vehicle power station in a VPP.

According to an aspect of the present disclosure, there is provided a communication failure handling device. The communication failure handling device according to the aspect of the present disclosure is a communication failure handling device in a virtual power plant (VPP) including an electric-vehicle power station that is able to connect a power system and a motor-driven vehicle and to perform a charging/discharging operation of the motor-driven vehicle and a control server that transmits a control instruction for controlling the charging/discharging operation to the electric-vehicle power station in a cycle of a first period. The communication failure handling device includes a processor and a memory. The processor is configured to cause the electric-vehicle power station to perform the charging/discharging operation. The memory is configured to be able to be accessed by the processor regardless of a communication state between the control server and the electric-vehicle power station and to store the control instruction transmitted in the cycle of the first period. Here, information on the charging/discharging operation in a second period which is longer than the first period is transmitted as the control instruction. The processor is configured to, when a communication failure has occurred between the control server and the electric-vehicle power station, read the information on the charging/discharging operation in the second period from the memory and to cause the electric-vehicle power station to perform the charging/discharging operation based on the information read from the memory.

In the communication failure handling device according to the aspect, the processor may be configured to cause the electric-vehicle power station to perform a fail-safe operation when the second period has elapsed after the communication failure has occurred. In the communication failure handling device according to the aspect, the memory may be provided in the electric-vehicle power station, may be provided in a communication device configured to relay communication between the control server and one or more electric-vehicle power stations, or may be provided in each of individual motor-driven vehicles joining in the VPP. In the communication failure handling device according to the aspect, the second period may be set to a longer period as the number of motor-driven vehicles joining in the VPP becomes larger, may be set to a shorter period as a permitted rate of change of electric power in the power system becomes smaller, or may be set to a shorter period as an achievement rate of a target amount of electric power in the VPP at a time point at which the communication failure has occurred becomes higher.

According to another aspect of the present disclosure, there is provided a communication failure handling method. The communication failure handling method according to the aspect of the present disclosure is a communication failure handling method in a virtual power plant (VPP) including an electric-vehicle power station that is able to connect a power system and a motor-driven vehicle and to perform a charging/discharging operation for the motor-driven vehicle and a control server that transmits a control instruction for controlling the charging/discharging operation to the electric-vehicle power station in a cycle of a first period. The communication failure handling method includes three steps. The first step is a step of transmitting information on the charging/discharging operation in a second period which is longer than the first period as the control instruction. The second step is a step of storing the control instruction transmitted in the cycle of the first period in a memory that is able to be accessed by the electric-vehicle power station regardless of a communication state between the control server and the electric-vehicle power station. The third step is a step of reading the information on the charging/discharging operation in the second period from the memory and causing the electric-vehicle power station to perform the charging/discharging operation based on the information read from the memory when a communication failure has occurred between the control server and the electric-vehicle power station.

With the communication failure handling device and method according to the present disclosure, when the control server and the electric-vehicle power station are communicating with each other normally, the charging/discharging operation for a motor-driven vehicle is performed by the electric-vehicle power station based on the control instruction transmitted in the cycle of the first period from the control server, and the control instruction is stored in the memory. When a communication failure has occurred between the control server and the electric-vehicle power station, information on the charging/discharging operation in the second period is read from the memory. The control instruction stored in the memory includes information on the charging/discharging operation in the second period longer than the first period which is an update cycle of the control instruction. Accordingly, even when a control instruction cannot be received from the control server due to the communication failure, the charging/discharging operation for the motor-driven vehicle is temporarily performed by the electric-vehicle power station based on the information read from the memory. As a result, it is possible to curb a decrease in charging/discharging performance when a communication failure has occurred between the control server and the electric-vehicle power station in the VPP.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described with reference to the accompanying drawings. In the following embodiment, when a numerical value such as a number, quantity, volume, or range of elements is mentioned, an idea of the present disclosure is not limited by the mentioned numerical value unless particularly explicitly described or unless the numerical value is specified clearly in principle. Structures and the like described in the following embodiment are not essential to the idea of the present disclosure unless particularly explicitly described or unless specified clearly in principle.

1. Overall Configuration of VPP

Figure 1:
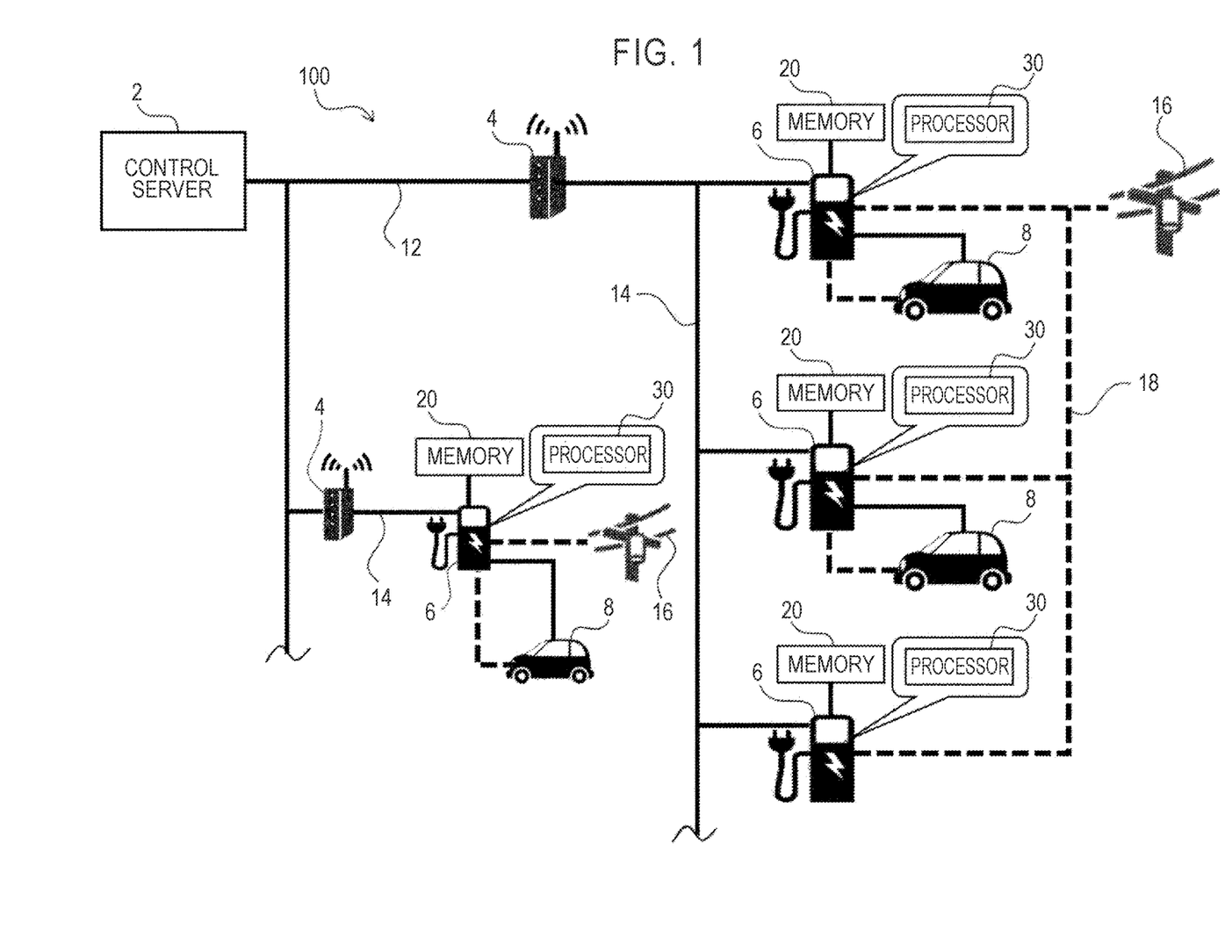
FIG. 1 is a diagram illustrating an overall configuration of a virtual power plant (VPP) to which a communication failure handling device according to an embodiment of the present disclosure is applied.

FIG. 1 is a diagram illustrating an overall configuration of a virtual power plant (VPP) 100 to which a communication failure handling device according to an embodiment of the present disclosure is applied. The VPP 100 according to this embodiment is a VPP using a plurality of motor-driven vehicles 8 as energy resources. The motor-driven vehicles 8 used in the VPP 100 include all motor-driven vehicles called xEV. For example, a pure electric vehicle (EV), a plug-in hybrid vehicle (PHV), and a fuel-cell electric vehicle (FCEV) are included as motor-driven vehicles 8 which can join in the VPP 100.

The VPP 100 includes a plurality of electric-vehicle (EV) power stations (EVPSs) 6 that is connected to a power system 16 via a power line 18. Each EV power station 6 is a power conversion device that is able to perform a charging/discharging operation for a motor-driven vehicle 8. Each motor-driven vehicle 8 serving as an energy resource of the VPP 100 is connected to the power system 16 via the corresponding EV power station 6. Charging of the motor-driven vehicle 8 with the power system 16 and discharging of electric power from the motor-driven vehicle 8 to the power system 16 are performed using the corresponding EV power station 6. Not all motor-driven vehicles can be connected to the power system 16. Only motor-driven vehicles 8 which have been registered in the VPP 100 can be used as motor-driven vehicles capable of being connected to the power system 16.

The VPP 100 includes a control server 2 that manages the charging/discharging operations of the EV power stations 6. The control server 2 is connected to the EV power stations 6 via wired or wireless communication networks 12 and 14. Specifically, the VPP 100 is connected to one or more communication devices (relay devices) 4 via an upper communication network 12, and the communication devices 4 are connected to one or more EV power stations 6 via a lower communication network 14. The control server 2 creates a charging/discharging plan for each motor-driven vehicle 8 based on electric power supply and demand which is required for the VPP 100. For example, since a request of electric power supply and demand for the VPP 100 is updated at intervals of about 1 minute to 30 minutes, the charging/discharging plan is periodically updated with update of the request of electric power supply and demand.

The control server 2 generates a control instruction in accordance with the charging/discharging plan for each motor-driven vehicle 8. The control instruction is information for controlling a charging/discharging operation which is performed on the corresponding motor-driven vehicle 8 by the corresponding EV power station 6 and is generated for each motor-driven vehicle 8. The control server 2 determines what motor-driven vehicle 8 is connected to what EV power station 6 based on information on the motor-driven vehicle 8 which is transmitted from the EV power station 6. The control server 2 transmits a control instruction prepared for an EV power station 6 connected to a motor-driven vehicle 8 to the EV power station 6 connected thereto. A transmission cycle in which the control server 2 transmits the control instruction to the EV power station 6 is set to a cycle shorter than an update cycle of the charging/discharging plan. For example, the control instruction is transmitted at intervals of about 5 seconds to 10 seconds.

Although details thereof will be described later, the control instruction generated in this embodiment is different from that for a general VPP in a data time length. A control instruction transmitted in a general VPP is updated at intervals the same length as the transmission cycle thereof and thus has a data time length which is the same length as the transmission cycle. However, the control instruction generated in this embodiment has a data time length which is longer than the transmission cycle.

The EV power station 6 to which the control instruction is transmitted includes a memory 20 and a processor 30. The processor 30 causes the EV power station 6 to operate in accordance with the control instruction transmitted from the control server 2. When the EV power station 6 operates in accordance with the control instruction, the charging/discharging operation of the EV power station 6 for the motor-driven vehicle 8 is performed. The memory 20 temporarily stores the control instruction transmitted from the control server 2 to the EV power station 6. The control instruction stored in the memory 20 can be read by the processor 30.

2. Operation of VPP

Figure 2:
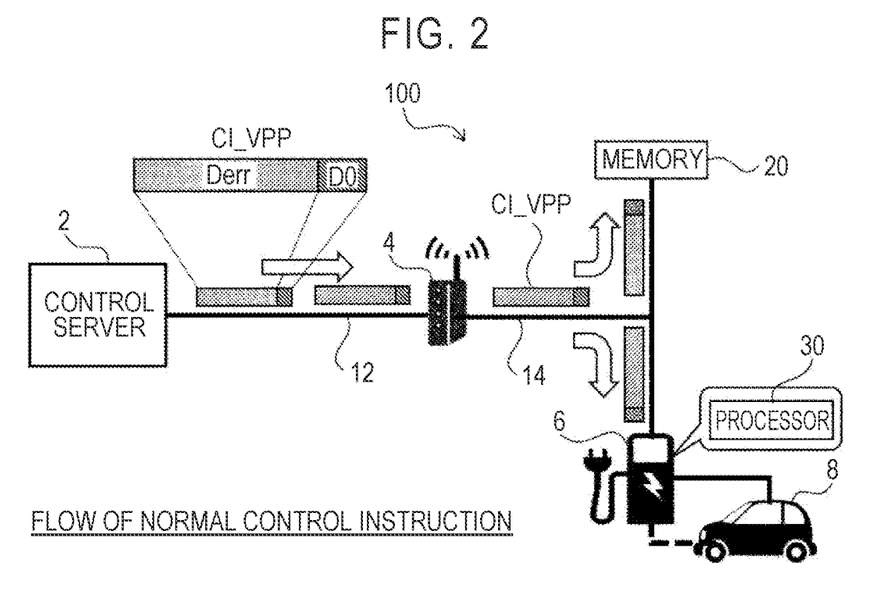
FIG. 2 is a diagram illustrating a normal operation of the VPP illustrated in FIG. 1.

The operation of the VPP 100 having the aforementioned configuration will be described below with reference to FIGS. 2 and 3. FIG. 2 is a diagram illustrating a normal operation of the VPP 100. In FIG. 2, a flow of a control instruction CI_VPP when normal communication is performed between the control server 2 and the EV power station 6 is illustrated. The control instruction CI_VPP includes basic data D0 having a data time length which is the same length as the transmission cycle (the update cycle) and failure handling data Derr having a data time length for handling a failure which will be described later. The basic data D0 corresponds to a control instruction which is transmitted in a general VPP. The control instruction CI_VPP includes instruction details up to the future which is distant by the failure handling data Derr.

The memory 20 is a constituent of the EV power station 6, but the memory 20 is illustrated separately from the EV power station 6 in FIG. 2 for the purpose of convenience of description of a flow of the control instruction CI_VPP. When normal communication is performed between the control server 2 and the EV power station 6, the control instruction CI_VPP is transmitted to both the EV power station 6 and the memory 20. The EV power station 6 performs a charging/discharging operation on the motor-driven vehicle 8 in accordance with the transmitted control instruction CI_VPP. Here, only the part of basic data D0 corresponding to the update cycle in the control instruction CI_VPP transmitted from the control server 2 is required for the EV power station 6. Accordingly, only the basic data D0 in the control instruction CI_VPP is temporarily stored in a cache of the processor 30, and the processor 30 causes the EV power station 6 to perform the charging/discharging operation based on the basic data D0. On the other hand, the memory 20 stores only the failure handling data Derr in the transmitted control instruction CI_VPP. When a new control instruction CI_VPP is transmitted every transmission cycle, the memory 20 updates the stored failure handling data Derr.

Figure 3:
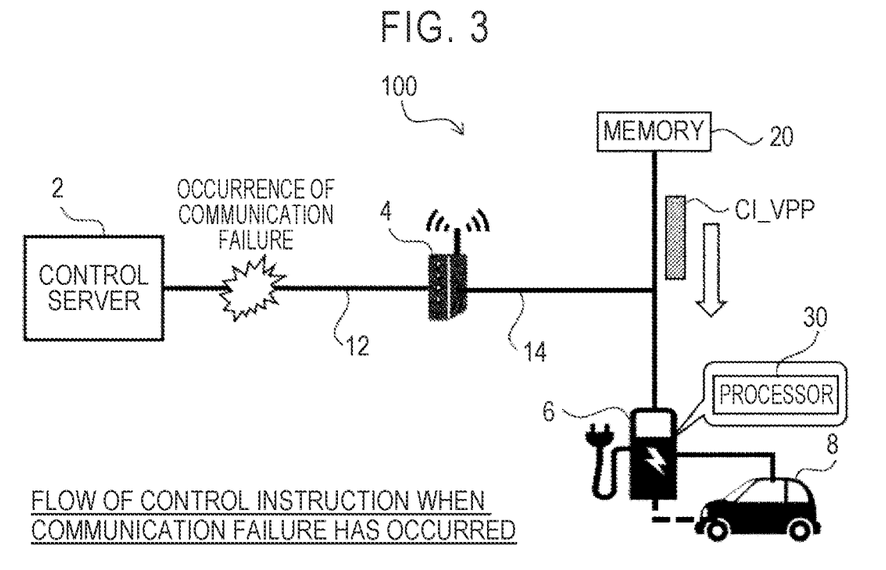
FIG. 3 is a diagram illustrating an operation of the VPP illustrated in FIG. 1 when a communication failure has occurred.

FIG. 3 is a diagram illustrating an operation of the VPP 100 when a communication failure has occurred. In FIG. 3, a flow of a control instruction CI_VPP when a communication failure has occurred between the control server 2 and the EV power station 6 is illustrated. In the example illustrated in FIG. 3, a communication failure has occurred in the upper communication network 12 that connects the control server 2 and a communication device 4. In this case, after the communication failure has occurred, a control instruction CI_VPP from the control server 2 does not reach the EV power station 6. Accordingly, in a general VPP, the EV power station cannot continue to perform the charging/discharging operation on a motor-driven vehicle.

However, the failure handling data Derr included in the newest control instruction CI_VPP is stored in the memory 20. The failure handling data Derr stored in the memory 20 is data which was generated before a communication failure has occurred and includes instruction details up to the future after the communication failure has occurred. Therefore, the failure handling data Derr stored in the memory 20 can be used in place of the basic data D0 which would have been transmitted from the control server 2 to the EV power station 6 when the communication failure would not have occurred. The processor 30 reads the failure handling data Derr from the memory 20 and causes the EV power station 6 to perform a charging/discharging operation based on the failure handling data Derr read from the memory 20. Accordingly, the charging/discharging operation of the EV power station 6 on the motor-driven vehicle 8 can be maintained by a data time length of the failure handling data Derr even after the communication failure has occurred, and a decrease of charging/discharging performance for the request of electric power supply and demand can be curbed.

The communication failure handling device according to this embodiment includes the memory 20 that stores a control instruction CI_VPP having the aforementioned data structure and a processor 30 that is programmed to perform the aforementioned process when a communication failure has occurred.

3. Advantages of Communication Failure Handling Device

Figure 4:
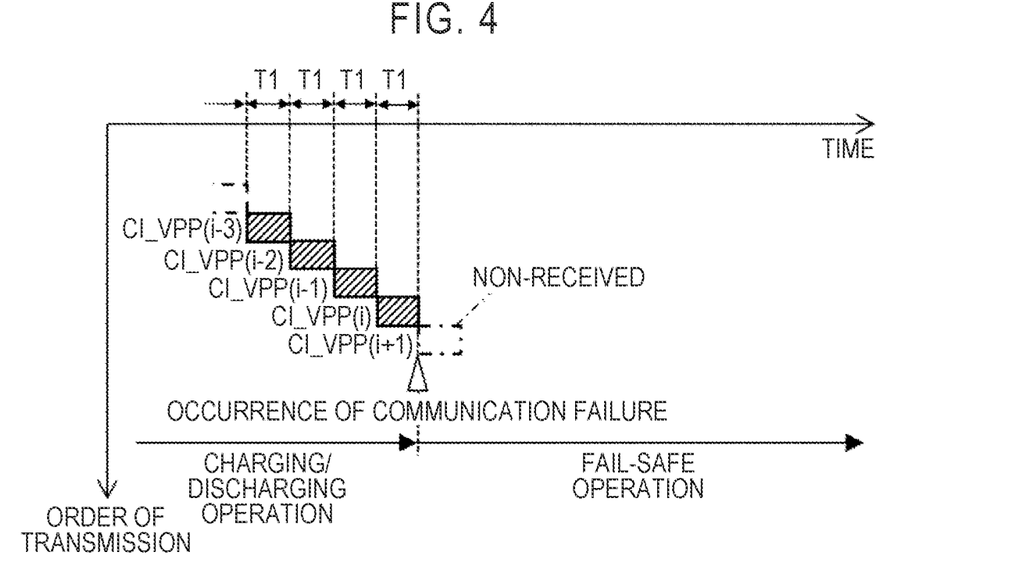
FIG. 4 is a diagram illustrating a problem when a communication failure has occurred in a general VPP based on a relationship between a transmission cycle of a control instruction and a data time length of the control instruction.

Advantages of the communication failure handling device according to this embodiment will be described below based on a relationship between a transmission cycle of a control instruction and a time length of the control instruction with reference to FIGS. 4 and 5. First, FIG. 4 is a diagram illustrating a relationship between a transmission cycle of a control instruction and a time length of the control instruction in a general VPP. In a general VPP, a transmission cycle (first period) T1 of a control instruction CI_VPP is fixed, and a data time length of the control instruction CI_VPP is the same as the transmission cycle T1.

In a normal state in which a communication failure does not occur, for example, the EV power station 6 receives an i-th control instruction CI_VPP(i) at a timing at which a charging/discharging operation based on an (i−1)-th control instruction CI_VPP(i−1) ends. Then, the EV power station 6 starts a charging/discharging operation based on the i-th control instruction CI_VPP(i). That is, in a general VPP, normally, the charging/discharging operation of the EV power station 6 is continuously performed based on a control instruction CI_VPP having the same data time length as the transmission cycle T1.

When communication between the control server 2 and the EV power station 6 is cut off due to a communication failure occurring while the charging/discharging operation based on the control instruction CI_VPP(i) is being performed, the EV power station 6 cannot receive an (i+1)-th control instruction CI_VPP(i+1). In this case, since the EV power station 6 cannot maintain the charging/discharging operation on the motor-driven vehicle 8, the EV power station 6 performs a predetermined fail-safe operation. In the fail-safe operation, for example, charging/discharging electric power of the motor-driven vehicle 8 is set to 0 kW such that a bad influence of a charging/discharging operation different from the original control instruction is minimized.

Figure 5:
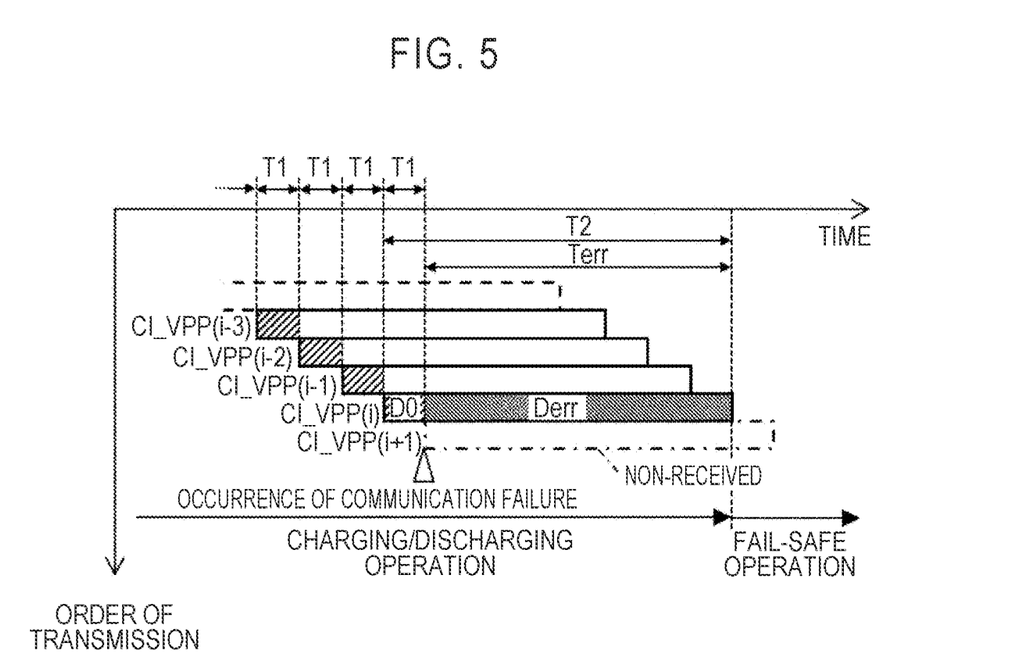
FIG. 5 is a diagram illustrating an advantage of the communication failure handling device according to the embodiment of the present disclosure based on a relationship between a transmission cycle of a control instruction and a data time length of the control instruction.

FIG. 5 is a diagram illustrating a relationship between a transmission cycle of a control instruction and a time length of the control instruction in the VPP 100 employing the communication failure handling device according to this embodiment. In the VPP 100, the control instruction CI_VPP includes basic data DO and failure handling data Derr. The data time length of the basic data DO is the same as the transmission cycle T1, and a total data time length (second period) T2 of the control instruction CI_VPP including a data time length Terr of the failure handling data Derr is longer than the transmission cycle T1.

In a normal state in which a communication failure does not occur, for example, the EV power station 6 receives an i-th control instruction CI_VPP(i) at a timing at which a charging/discharging operation based on the basic data DO of an (i−1)-th control instruction CI_VPP(i−1) ends. Then, the EV power station 6 starts a charging/discharging operation based on the basic data DO of the i-th control instruction CI_VPP(i). That is, in the VPP 100, normally, the charging/discharging operation of the EV power station 6 is continuously performed based on the basic data DO of the control instruction CI_VPP having the same data time length as the transmission cycle T1.

Here, it is assumed that a communication failure has occurred while the charging/discharging operation based on the control instruction CI_VPP(i) is being performed and thus communication between the control server 2 and the EV power station 6 has cut off. In this case, the EV power station 6 cannot receive the (i+1)-th control instruction CI_VPP(i+1) and cannot continuously perform the charging/discharging operation based on the basic data DO. However, the failure handling data Derr of the newest control instruction CI_VPP(i) is stored in the memory 20. The processor 30 of the communication failure handling device according to this embodiment reads the failure handling data Derr from the memory 20 and causes the EV power station 6 to perform the charging/discharging operation based on the failure handling data Derr. Accordingly, the EV power station 6 can continuously perform the charging/discharging operation on the motor-driven vehicle 8 for a longer time corresponding to the data time length Terr of the failure handling data Derr, and a decrease of charging/discharging performance in response to a request of electric power supply and demand can be curbed. After the data time length Terr has elapsed, the EV power station 6 performs a predetermined fail-safe operation and transitions to a standby mode.

4. Communication Failure Handling Method in VPP

Figure 6:
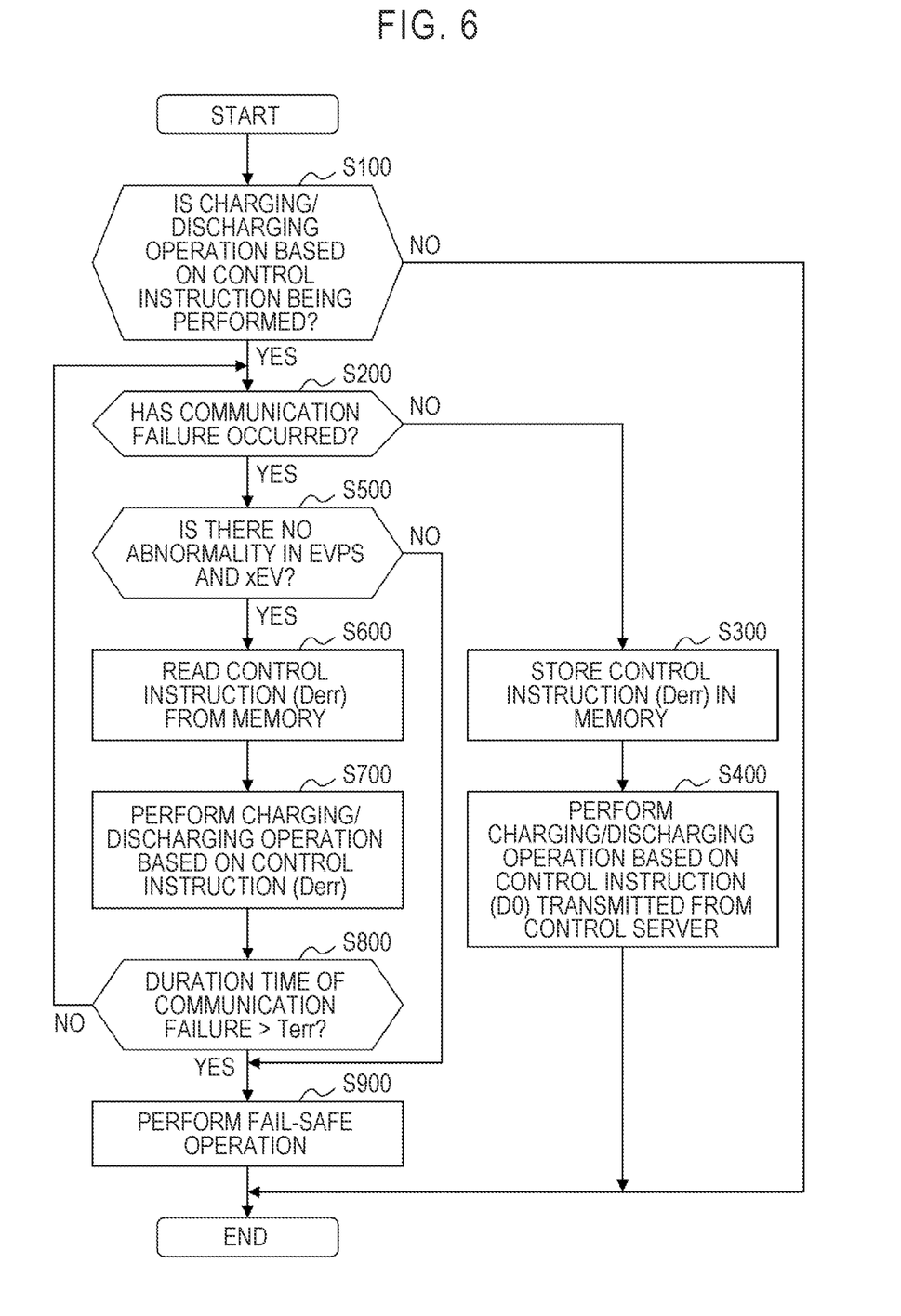
FIG. 6 is a flowchart illustrating a communication failure handling method according to the embodiment of the present disclosure.

FIG. 6 is a flowchart illustrating a communication failure handling method in the VPP 100 employing the communication failure handling device according to this embodiment. The communication failure handling method illustrated in the flowchart is performed by the processor 30 of the communication failure handling device according to this embodiment.

In Step S100, the processor 30 determines whether a charging/discharging operation based on a control instruction from the control server 2 is being performed. For example, when a motor-driven vehicle 8 is not connected to the EV power station 6, the charging/discharging operation of the EV power station 6 on the motor-driven vehicle 8 is not performed. Even when a motor-driven vehicle 8 is connected to the EV power station 6, the charging/discharging operation of the EV power station 6 on the motor-driven vehicle 8 is not performed after an amount of charging electric power or an amount of discharging electric power required by a charging/discharging plan has been achieved.

When a charging/discharging operation based on a control instruction from the control server 2 is being performed, determination of Step S200 is then performed. In Step S200, the processor 30 determines whether a communication failure with the control server 2 has occurred. At what position the communication failure has occurred does not matter. The processor 30 determines that a communication failure has occurred when a newest control instruction cannot be received at a time point at which the transmission cycle T1 has elapsed after a previous control instruction has been received.

When a communication failure has not occurred and a control instruction can be received every transmission cycle T1, the processor 30 performs Steps S300 and S400. In Step S300, the processor 30 stores failure handling data Derr included in a newest control instruction in the memory 20. In Step S400, the processor 30 causes the EV power station 6 to perform a charging/discharging operation on the motor-driven vehicle 8 based on the basic data DO of the newest control instruction transmitted from the control server 2.

When a control instruction cannot be received from the control server 2 due to occurrence of a communication failure, the processor 30 first performs determination of Step S500. In Step S500, the processor 30 determines whether there is an abnormality in an EV power station (EVPS) 6 and a motor-driven vehicle (xEV) 8 connected thereto using existing diagnosis techniques. This abnormality determination is performed to ascertain that the communication failure is not based on an abnormality of the EV power station 6 or the motor-driven vehicle 8. When there is an abnormality in one of the EV power station 6 and the motor-driven vehicle 8, the processor 30 performs Step S900. In Step S900, the processor 30 causes the EV power station 6 to stop the charging/discharging operation on the motor-driven vehicle 8 and to perform a fail-safe operation. After the fail-safe operation has been performed, the EV power station 6 transitions to a standby mode.

When there is no abnormality in the EV power station 6 and the motor-driven vehicle 8, the processor 30 performs Steps S600 and S700. In Step S600, the processor 30 reads the failure handling data Derr of the newest control instruction stored in Step S300 from the memory 20. In Step S700, the processor 30 causes the EV power station 6 to perform a charging/discharging operation on the motor-driven vehicle 8 based on the failure handling data Derr of the control instruction read from the memory 20.

In Step S800, the processor 30 determines whether a duration time of the communication failure is greater than the data time length Terr of the failure handling data Derr. Until the duration time of the communication failure is greater than the data time length Terr of the failure handling data Derr, the processes of Steps S200, S500, and S700 are repeatedly performed (Step S600 is performed only once and is skipped thereafter). That is, until the time Terr elapses after the communication failure has occurred, the processor 30 causes the EV power station 6 to continuously perform the charging/discharging operation on the motor-driven vehicle 8.

When the communication failure is resolved and a control instruction can be received from the control server 2 before the time Terr elapses, the processor 30 restarts performing the processes in a normal state, that is, the processes of Steps S300 and S400. When the duration time of the communication failure is greater than the data time length Terr of the failure handling data Derr, the processor 30 performs Step S900. In Step S900, the processor 30 causes the EV power station 6 to perform a fail-safe operation. After the fail-safe operation has been performed, the EV power station 6 transitions to a standby mode.

5. Method of Determining Data Time Length Terr of Failure Handling Data

As described above, with the communication failure handling device and method according to this embodiment, the control instruction transmitted from the control server 2 to the EV power station 6 includes failure handling data Derr. The data time length Terr of the failure handling data Derr can be arbitrarily set, and may be, for example, a fixed value. As the data time length Terr is set to a longer time, the charging/discharging operation of the EV power station 6 on the motor-driven vehicle 8 can be maintained for a longer time after the communication failure has occurred. Here, a newest situation of electric power after the communication failure has occurred is not reflected in the failure handling data Derr included in the control instruction. Accordingly, when the data time length Terr of the failure handling data Derr is set to be excessively long, acquired charging/discharging electric power may be separated from a request of electric power supply and demand and the power system 16 may be badly affected.

Therefore, it is preferable that the data time length Terr of the failure handling data Derr is determined using the following method. The method of determining the data time length Terr of the failure handling data Derr includes the following three methods.

Figure 7:
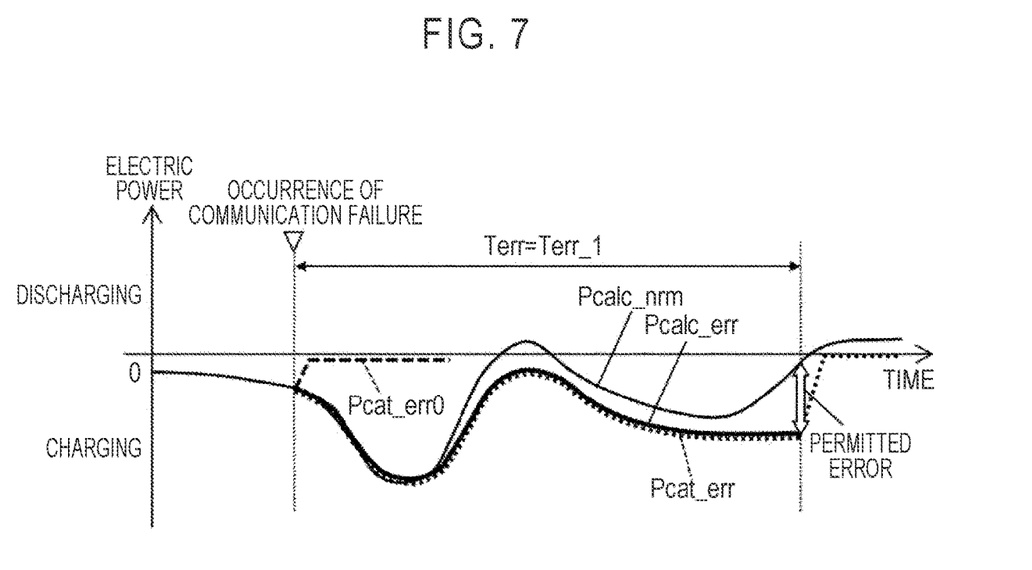
FIG. 7 is a diagram illustrating a first method of determining a data time length Terr of failure handling data included in a control instruction.

In a first determination method, the data time length Terr is determined based on the number of motor-driven vehicles joining in the VPP 100. In the VPP 100, 100 or more motor-driven vehicles 8 perform a charging/discharging operation on a power system 16 in the same region in some scales. In this case, since an influence of one motor-driven vehicle becomes smaller as the number of motor-driven vehicles 8 connected to the power system 16 becomes larger, an influence of the data time length Terr being long also becomes smaller. That is, as the number of motor-driven vehicles 8 joining in (connected to) the VPP 100 becomes larger, the data time length Terr can be set to be longer. Since simultaneous occurrence of a communication failure in a plurality of motor-driven vehicles can be considered, an upper limit of the data time length Terr is necessary.

FIG. 7 illustrates a change of charging/discharging electric power with time when a charging/discharging operation is controlled based on the failure handling data Derr having the data time length Terr determined by the first determination method after a communication failure has occurred. In FIG. 7, a solid curve indicated by Pcalc_nrm represents a target value of charging/discharging electric power when a communication failure has not occurred. On the other hand, a solid curve indicated by Pcalc_err represents a calculated value of charging/discharging electric power based on the failure handling data Derr. A dotted curve indicated by Pact_err0 represents a change of an actual value of charging/discharging electric power when a charging/discharging operation based on the failure handling data Derr has not been performed after a communication failure has occurred. On the other hand, a dotted curve indicated by Pact_err represents a change of an actual value of charging/discharging electric power when a charging/discharging operation based on the failure handling data Derr has been performed after a communication failure has occurred.

As can be clearly seen from comparison between Pact_err0 and Pact_err in FIG. 7, it is possible to curb a decrease of charging/discharging performance by performing a charging/discharging operation based on the failure handling data Derr. However, a distance between a target value Pcalc_nrm which is a newest calculated value and a previous calculated value Pcalc_nrm increases with the elapse of time and thus the distance between the target value Pcalc_nrm and the actual value Pact_err also increases. Therefore, in the first determination method, a time in which an error between the target value Pcalc_nrm and the actual value Pact_err is considered to be greater than an allowable error is determined as the data time length Terr. The allowable error is determined based on the number of motor-driven vehicles 8 joining in the VPP 100 and is set to a larger value as the number of motor-driven vehicles joining becomes larger. In the following description, the data time length Terr determined using the first determination method is referred to as Terr_1.

Figure 8:
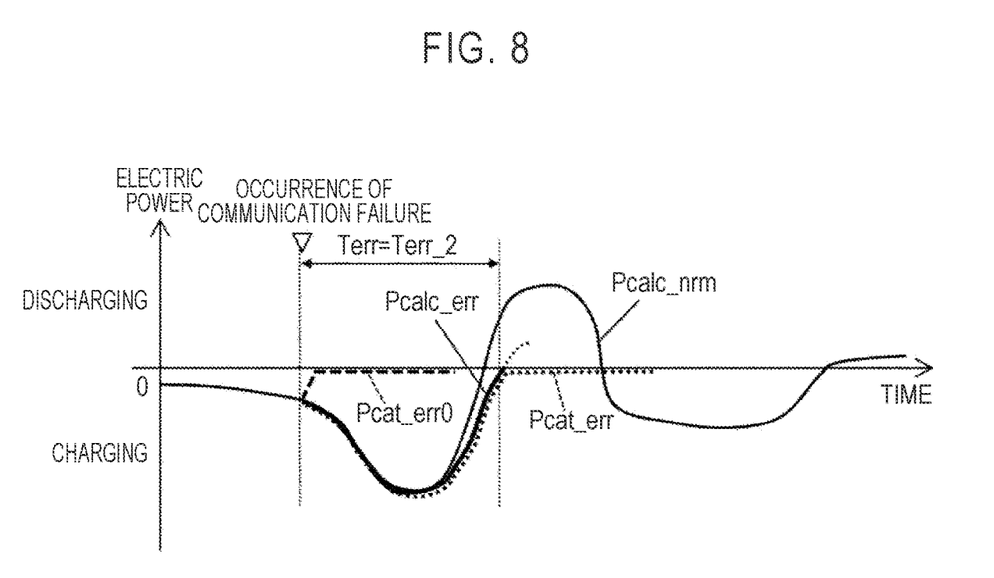
FIG. 8 is a diagram illustrating a second method of determining a data time length Terr of failure handling data included in a control instruction.

In a second determination method, the data time length Terr is determined based on a permitted rate of change in total electric power in the power system 16 in the same region. Since an error between the target value Pcalc_nrm and the actual value Pact_err increases as the data time length Terr increases, the data time length Terr needs to be shorter as the permitted rate of change in electric power becomes lower. The permitted rate of change in electric power can be calculated through calculation based on a capacity of the power system 16 and a use state of electric power therein. Examples in which the permitted rate of change in electric power becomes lower include a case in which the power system 16 in the region approaches saturation through photovoltaic power generation and a case in which an amount of power consumption is great and there is difficulty in maintaining a voltage.

Electric power of the power system 16 changes depending on whether the charging/discharging operation on the motor-driven vehicle 8 is a charging operation or a discharging operation. Whether it is a charging operation or a discharging operation affects a battery of the motor-driven vehicle 8. Therefore, in the second determination method, when charging and discharging switch in calculating the failure handling data Derr, the failure handling data Derr is limited until charging/discharging electric power is zero. That is, as illustrated in FIG. 8, a period in which the calculated value Pcalc_err of charging/discharging electric power based on the failure handling data Derr is held on the charging side is determined as the data time length Terr. Alternatively, a period in which the calculated value Pcalc_err of charging/discharging electric power based on the failure handling data Derr is held on the discharging side is determined as the data time length Terr. In the following description, the data time length Terr determined using the second determination method is referred to as Terr_2.

Figure 9:
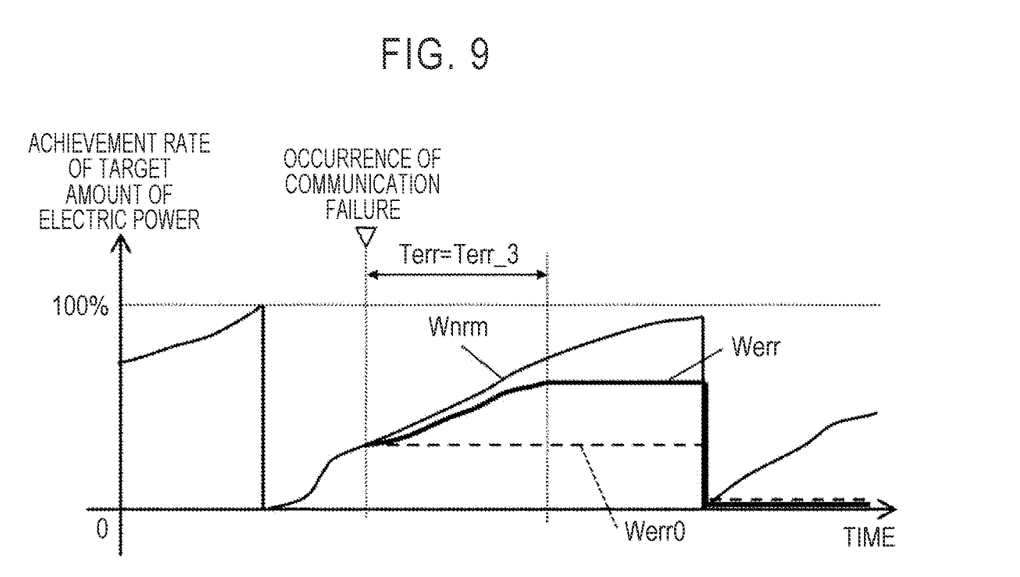
FIG. 9 is a diagram illustrating a third method of determining a data time length Terr of failure handling data included in a control instruction.
Figure 10:
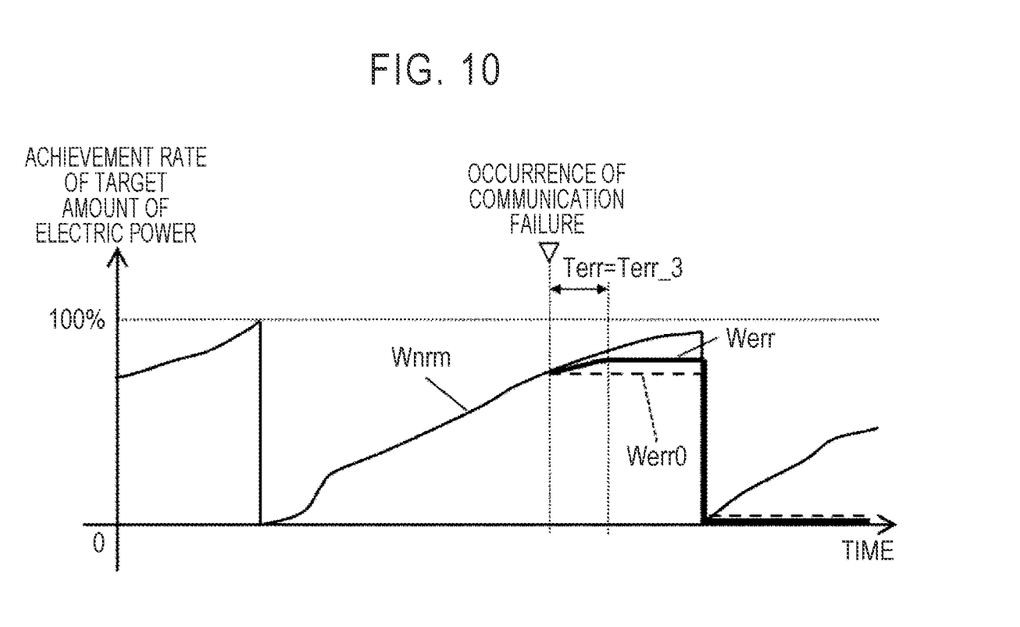
FIG. 10 is a diagram illustrating the third method of determining a data time length Terr of failure handling data included in a control instruction.

In a third determination method, the data time length Terr is determined based on a rate of achievement of a target amount of electric power in the VPP 100. The charging/discharging operation after a communication failure has occurred can curb a decrease in charging/discharging performance, but may cause an error when it is performed for a long time. Accordingly, when a target amount of electric power in a certain time is achieved to a certain extent as a performance result of the VPP 100, the charging/discharging operation based on the failure handling data Derr does not need to be performed for a long time after the communication failure has occurred. Therefore, in the third determination method, it is monitored to what extent the target amount of electric power in the VPP 100 is achieved as a performance result, and the data time length Terr is determined based on a rate of achievement of the target amount of electric power at a time point at which the communication failure has occurred.

FIGS. 9 and 10 illustrate an example of a change of a rate of achievement of a target amount of electric power with time. In the drawings, a solid curve indicated by Wnrm represents a rate of achievement of a target amount of electric power when a communication failure has not occurred. On the other hand, a solid curve indicated by Werr represents a rate of achievement of a target amount of electric power when a charging/discharging operation based on the failure handling data Derr is performed after a communication failure has occurred and then a fail-safe operation is performed. A dotted curve indicated by Werr0 represents a rate of achievement of a target amount of electric power when a fail-safe operation is performed immediately after a communication failure has occurred.

When the rate of achievement of a target amount of electric power at a time point at which the communication failure has occurred is relatively low, the data time length Terr is set to a relatively long time as illustrated in FIG. 9. Accordingly, it is possible to curb a decrease of charging/discharging performance by continuously performing the charging/discharging operation on the motor-driven vehicle 8 even after the communication failure has occurred. On the other hand, when the rate of achievement of a target amount of electric power at a time point at which the communication failure has occurred is relatively high, the data time length Terr is set to a relatively short time as illustrated in FIG. 10. Accordingly, it is possible to prevent the rate of achievement of a target amount of electric power from being decreased due to an error which is generated by the charging/discharging operation after the communication failure has occurred. In the following description, the data time length Terr determined using the third determination method is referred to as Terr_3.

While three determination methods of determining the data time length Terr of the failure handling data Derr have been described above, any one determination method may be used or two or more determination methods may be used in combination. For example, when the first to third determination methods are used in combination, the shortest of the data time lengths Terr_1, Terr_2, and Terr_3 acquired using the determination methods is determined as the final data time length Terr.

6. Other Embodiments

In the aforementioned embodiment, the memory 20 is provided in each EV power station 6, but the installation position of the memory 20 is not particularly limited as long as it can be accessed by the processor 30 without being affected by a communication state between the control server 2 and the EV power station 6. For example, the memory 20 may be installed in each motor-driven vehicle 8, or the memory 20 may be installed in each communication device 4. Similarly, the processor 30 may be installed in each motor-driven vehicle 8, or the processor 30 may be installed in each communication device 4.

What is claimed is:

1. A communication failure handling device in a virtual power plant (VPP) including an electric-vehicle power station that is able to connect a power system and a motor-driven vehicle and to perform a charging/discharging operation of the motor-driven vehicle and a control server that transmits a control instruction for controlling the charging/discharging operation to the electric-vehicle power station in a cycle of a first period, the communication failure handling device comprising:
   a processor configured to cause the electric-vehicle power station to perform the charging/discharging operation; and
   a memory configured to be accessible by the processor regardless of a communication state between the control server and the electric-vehicle power station and to store the control instruction transmitted in the cycle of the first period,
   wherein information on the charging/discharging operation in a second period which is longer than the first period is transmitted as the control instruction,
   wherein the processor is configured to, when a communication failure has occurred between the control server and the electric-vehicle power station, read the information on the charging/discharging operation in the second period from the memory and to cause the electric-vehicle power station to perform the charging/discharging operation based on the information read from the memory; and
   wherein the second period is set to a shorter period as an achievement rate of a target amount of electric power in the VPP at a time point at which the communication failure has occurred becomes higher.

2. The communication failure handling device in a VPP according to claim 1, wherein the processor is configured to cause the electric-vehicle power station to perform a fail-safe operation when the second period has elapsed after the communication failure has occurred.

3. The communication failure handling device in a VPP according to claim 1, wherein the memory is provided in the electric-vehicle power station.

4. The communication failure handling device in a VPP according to claim 1, wherein the memory is provided in a communication device configured to relay communication between the control server and one or more electric-vehicle power stations.

5. The communication failure handling device in a VPP according to claim 1, wherein the memory is provided in each of individual motor-driven vehicles joining in the VPP.

6. The communication failure handling device in a VPP according to claim 1, wherein the second period is set to a longer period as the number of motor-driven vehicles joining in the VPP becomes larger.

7. The communication failure handling device in a VPP according to claim 1, wherein the second period is set to a shorter period as a permitted rate of change of electric power in the power system becomes smaller.

8. The communication failure handling device in a VPP according to claim 1, wherein the processor is configured to determine whether an abnormality has occurred in the motor-driven vehicle and the electric-vehicle power station when the communication failure has occurred and to cause the electric-vehicle power station to stop the charging/discharging operation for the motor-driven vehicle when an abnormality has occurred in the motor-driven vehicle or the electric-vehicle power station.

9. A communication failure handling method in a virtual power plant (VPP) including an electric-vehicle power station that is able to connect a power system and a motor-driven vehicle and to perform a charging/discharging operation for the motor-driven vehicle and a control server that transmits a control instruction for controlling the charging/discharging operation to the electric-vehicle power station in a cycle of a first period, the communication failure handling method comprising:

transmitting information on the charging/discharging operation in a second period which is longer than the first period as the control instruction;

storing the control instruction transmitted in the cycle of the first period in a memory that is accessible by the electric-vehicle power station regardless of a communication state between the control server and the electric-vehicle power station; and reading the information on the charging/discharging operation in the second period from the memory and causing the electric-vehicle power station to perform the charging/discharging operation based on the information read from the memory when a communication failure has occurred between the control server and the electric-vehicle power station, wherein the second period is set to a shorter period as an achievement rate of a target amount of electric power in the VPP at a time point at which the communication failure has occurred becomes higher.

10. The communication failure handling device in a VPP according to claim 1, wherein the processor is configured such that a data time length of failure handling data of the control instruction is set to a first time period when the achievement rate of the target amount of electric power at a time point at which the communication failure has occurred is a first value, and the data time length is set to a second time period when the achievement rate of the target amount of electric power at the time point at which the communication failure has occurred is a second value, wherein the first time period is less than the second time period and the first value is greater than the second value.

11. The communication failure handling method according to claim 9, wherein a data time length of failure handling data of the control instruction is set to a first time period when the achievement rate of the target amount of electric power at a time point at which the communication failure has occurred is a first value, and the data time length is set to a second time period when the achievement rate of the target amount of electric power at the time point at which the communication failure has occurred is a second value, wherein the first time period is less than the second time period and the first value is greater than the second value.

* * * * *